(12) United States Patent
Cormier et al.

(10) Patent No.: US 8,495,579 B2
(45) Date of Patent: Jul. 23, 2013

(54) TESTING NOTIFICATION-BASED SOFTWARE APPLICATIONS

(75) Inventors: Bertrand Cormier, Tournefeuille (FR); Emmanuel Wurth, Saubens (FR)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/391,464

(22) Filed: Feb. 24, 2009

(65) Prior Publication Data

US 2009/0259992 A1 Oct. 15, 2009

(30) Foreign Application Priority Data

Apr. 9, 2008 (EP) .................................... 08154231
Apr. 23, 2008 (EP) .................................... 08305122

(51) Int. Cl.
*G06F 9/44* (2006.01)
(52) U.S. Cl.
USPC .......................................... 717/126; 719/318
(58) Field of Classification Search
USPC ........................................................ 717/126
See application file for complete search history.

(56) References Cited

U.S. PATENT DOCUMENTS 7,720,918 B1 * 5/2010 Martin et al. ................. 709/206
2005/0208941 A1 * 9/2005 Ordille et al. ............. 455/435.1

OTHER PUBLICATIONS

X. Bai et al., "WSDL-based automatic test case generation for web services testing" published in Proc. IEEE International Workshop on Service-Oriented System Engineering, pp. 215-220, 2005.*
X. Bai et al., "WSDL-based automatic test case generation for web services testing" published in Proc. IEEE International Workshop on Service-Oriented System Engineering pp. 215-220 2005 (http://arxiv.org/pdf/1210.6110v1.pdf).*

* cited by examiner

*Primary Examiner* — Don Wong
*Assistant Examiner* — Deric Ortiz
(74) *Attorney, Agent, or Firm* — Patents on Demand P.A.; Brian K. Buchheit; Scott M. Garrett

(57) ABSTRACT

A solution is proposed for testing a notification-based software application in a service oriented data processing environment (e.g., implementing the WS-Notification specification). The software application includes one or more notification producers. Each notification producer is adapted to distribute notification messages (e.g., of the SOAP type) to notification consumers that are subscribed thereto—according to a specification defined in a corresponding publication, such as a WSDL document. For each notification producer, a corresponding method starts with the step of creating a subscribe request according to the publication—in order to subscribe a tester as a notification consumer to the notification producer. The subscribe request is then submitted to the notification producer. At this point, there is verified a result of the subscription. The method continues by verifying a reception by the tester of a test notification message from the notification producer.

20 Claims, 7 Drawing Sheets

TESTING NOTIFICATION-BASED SOFTWARE APPLICATIONS

CROSS-REFERENCE TO RELATED APPLICATIONS

This application claims the benefit of European Patent Application No. 08305122.7 filed 23 Apr. 2008, entitled "Automated Test Generation for Publisher/Subscriber Application", which is assigned to the assignee of the present application, and the teachings of which are hereby incorporated by reference in their entirety.

BACKGROUND

The present invention relates to the information technology field. Particularly, the present invention relates to the test of notification-based software applications in a service oriented data processing environment.

Services oriented data processing environments have become increasingly popular in recent years. Generally speaking, a service consists of a stand-alone basic task. The service may be requested through a well-defined interface, which is independent of its underlying implementation. The services can then be combined at will into complex software applications. This promotes the reuse and the interconnection of the existing services, even among different platforms, thereby strongly reducing the development costs and allowing deploying dynamic solutions. The resulting software applications are very efficient (since they can exploit different techniques each one optimized for a specific situation), flexible (since it is possible to change the implementation of any service with no impact on the whole software application) and readily expandable (since new functionalities can be added as soon as the corresponding services are available).

A typical service oriented environment is the one conforming to the "Service Oriented Architecture (SOA)" standard. For example, a SOA environment can be one as implemented in the "IBM SOA Foundation" by International Business Machines Corporation (IBM). Commonly, the SOA is deployed with the technology of web services. Particularly, the web services are formally defined in a public document, which provides an abstract definition thereof and a concrete definition of their binding to specific transmission protocols. An example of a transmission protocol that is commonly used to implement the web services is the "Simple Object Access Protocol (SOAP)". Different specifications (denoted with the prefix "WS-") are also available to standardize specific aspects of the web services.

In this context, a typical pattern for interaction with the services is the one based on notifications. Particularly, in the notification-based pattern the services that wish to consume information register dynamically with one or more other services that are capable of distributing it. The latter services then transmit the information individually to the services that are registered to receive it. In this way, it is possible to disseminate information to any services without the need of any prior knowledge thereof. For example, the notification-based pattern is used in message middleware domains, in system management domains, and the like. Particularly, in the case of web services the notification-based pattern is defined in a corresponding specification (referred to as "WS-Notification").

However, the extreme flexibility and dynamism of the services make it very difficult to test the software applications based thereon (in order to verify whether they behave correctly as expected). Indeed, the continual introduction of new standards and the high number of specifications that are available for the services dramatically increase the complexity of a corresponding test process.

This requires infrastructures (to run the test process) that become more and more expensive. Moreover, the definition of the test process and its running involve a heavy human intervention. Therefore, the process is far from optimal and in any case its quality strongly depends on personal experience.

All of the above has a detrimental impact on the cost of the test process. This hinders the extensive application of the test process, with a negative repercussion on the reliability of the software applications.

BRIEF SUMMARY

In its general terms, the present invention is based on the idea of creating a default test for notification-based software applications.

More specifically, different aspects of the invention provide a solution as set out in the independent claims. Advantageous embodiments of the invention are set out in the dependent claims.

For example, an aspect of the invention proposes a method for testing a notification-based software application in a service oriented data processing environment (e.g., implementing the WS-Notification specification). The software application includes one or more notification producers. Each notification producer can be adapted to distribute notification messages (e.g., of the SOAP type) to notification consumers that are subscribed thereto according to a specification defined in a corresponding publication, such as a WSDL document. For each notification producer, the method starts with the step of creating a subscribe request according to the publication in order to subscribe a tester as a notification consumer to the notification producer. The subscribe request is then submitted to the notification producer. At this point, there is verified a result of the subscription (e.g., waiting for a reference to a subscription resource representing the subscription). The method continues by verifying a reception by the tester of a test notification message (or more) from the notification producer (e.g., within a predefined time-out). For this purpose, when the notification producer is a notification broker that receives the notification messages from separate publishers, it is also possible to create the test notification message according to the publication. The created test notification message can be submitted to the notification producer.

Another aspect of the invention proposes a computer program for performing the above-described method.

A further aspect of the invention proposes a service for performing the same method.

A different aspect of the invention proposes a corresponding system.

DETAILED DESCRIPTION

Figure 1:
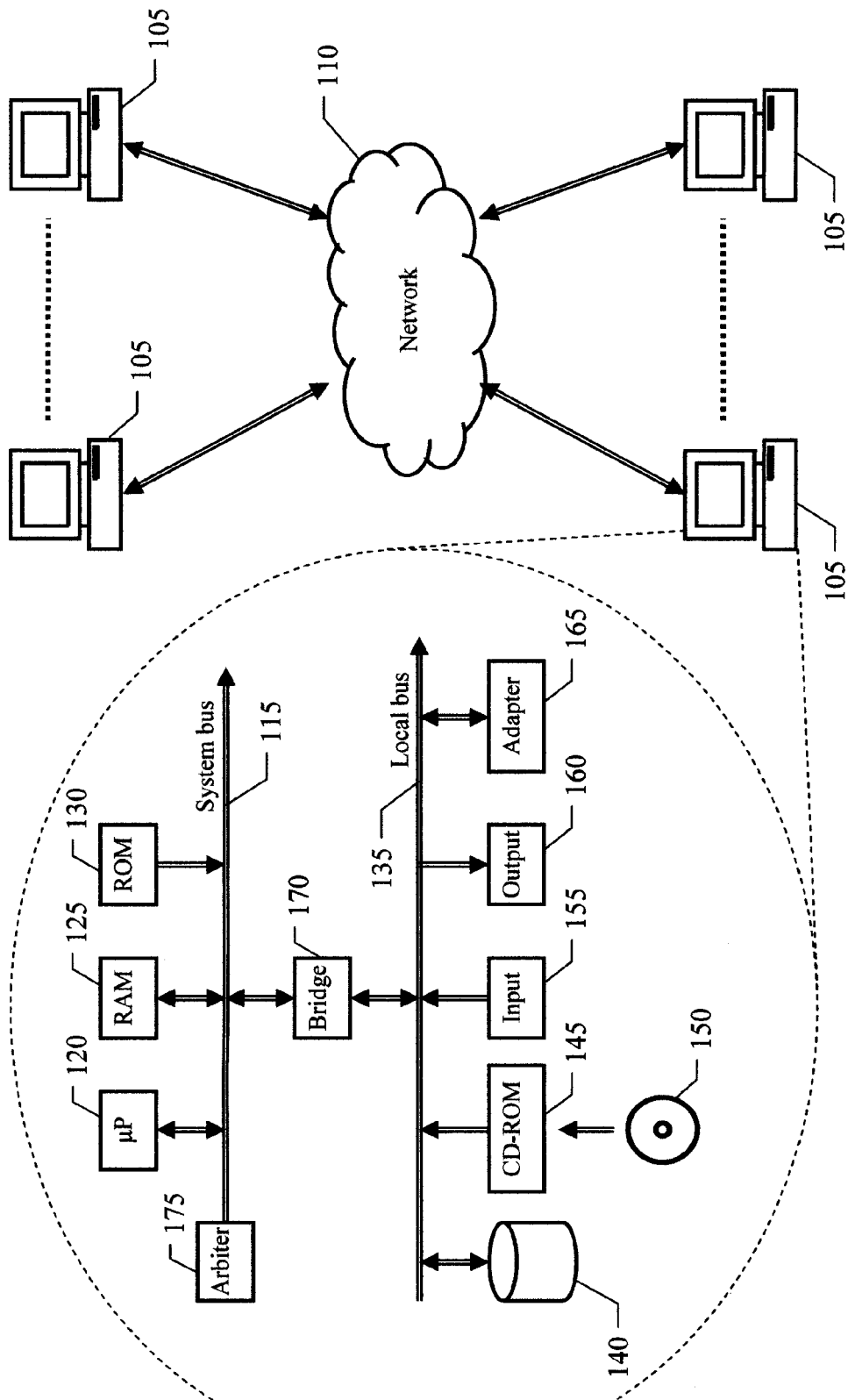
FIG. 1 is a schematic block diagram of a data processing system that can be used to practice the solution according to an embodiment of the invention.

With reference in particular to FIG. 1, there is shown a schematic block diagram of a data processing system 100 that can be used to practice the solution according to an embodiment of the invention. The system 100 has a distributed architecture, with a set of computers 105 (e.g., personal computers, smartphones, etc.) that communicate through a network 110, such as the Internet.

A generic computer 105 is formed by several units that are connected in parallel to a system bus 115. In detail, one or more microprocessors (μP) 120 control operation of the computer 105. A RAM 125 is directly used as a working memory by the microprocessors 120. A ROM 130 stores basic code for a bootstrap of the computer 105. Several peripheral units are clustered around a local bus 135 by means of respective interfaces. Particularly, a mass memory consists of one or more hard-disks 140 and drives 145 for reading DVD- or CD-ROMs 150. Moreover, the computer 105 includes input units 155 (e.g., a keyboard and a mouse), and output units 160 (e.g., a monitor and a printer). An adapter 165 is used to connect the computer 105 to the network 110. A bridge unit 170 interfaces the system bus 115 with the local bus 135. Each microprocessor 120 and the bridge unit 170 can operate as master agents requesting an access to the system bus 115 for transmitting information. An arbiter 175 manages the granting of the access with mutual exclusion to the system bus 115.

The system 100 offers a number of services, which can include a set of services conforming to a SOA standard. Particularly, each service can perform a repeatable task that may be performed by any provider on behalf of any consumer. The service and its interface to be invoked by the consumers can be formally described in a corresponding contract. The services can be loosely coupled (i.e., each consumer invoking a generic service makes its requirements explicit without any assumption about the corresponding provider), and their invocations can be self-contained (i.e., independent of each and every other invocation).

The SOA does not indicate any specific technology for its deployment. However, the SOA typically runs web services. Briefly, the web services are defined in a Web Services Description Language (WSDL) document, which is written in an XML-based specification conforming to the Universal Description, Discovery and Integration (UDDI) standard. Particularly, the WSDL document consists of a set of XML-based definitions, which are split into abstract definitions and concrete definitions. This allows abstract definitions to be reused for different technologies. The abstract definitions are comprised of types (specifying data types relevant for the web services), messages (specifying the types of data being exchanged), operations (specifying supported actions in terms of the messages involved), and portType (grouping related operations). On the other hand, the concrete definitions are comprised of bindings (associating concrete protocols and data format specifications to operations and messages for the portTypes), ports (specifying network addresses for web servers implementing the portTypes) and services (grouping related ports).

The WSDL is extended with specific binding elements for the most common standard protocols, such as the SOAP. The SOAP is a high-level protocol allowing the exchange of messages between heterogeneous nodes, with the SOAP messages that travel from an initial sender node to an ultimate receiver node, possibly by passing through a set of intermediary nodes along a corresponding path. For each node along the message path, the SOAP messages are bound to an (actual) transport protocol, which provides a serialized representation of the SOAP message allowing it to be conveyed to the next node with each node that may exploit a different transport protocol. The SOAP supports the most common transport protocols, such as the HyperText Transfer Protocol (HTTP). A client can identifies a server with its Uniform Resource Identifier (URI), can connect to the server using the underlying TCP/IP protocol, can issue a HTTP request, and can receive a HTTP response over the same connection.

Particularly, the web services may interact according to a notification-based pattern. The notification-based pattern is defined in the WS-Notification specification, which standardizes the corresponding roles, messages, WSDL document and XML schema. For example, as descried at: http://www.ibm.com/developerworks/library/specification/ws-notification/ (the entire disclosure of which is herein incorporated by reference). The WS-Notification may be either of the base type (WS-BaseNotification) or of the brokered type (WS-BrokeredNotification).

Figure 2:
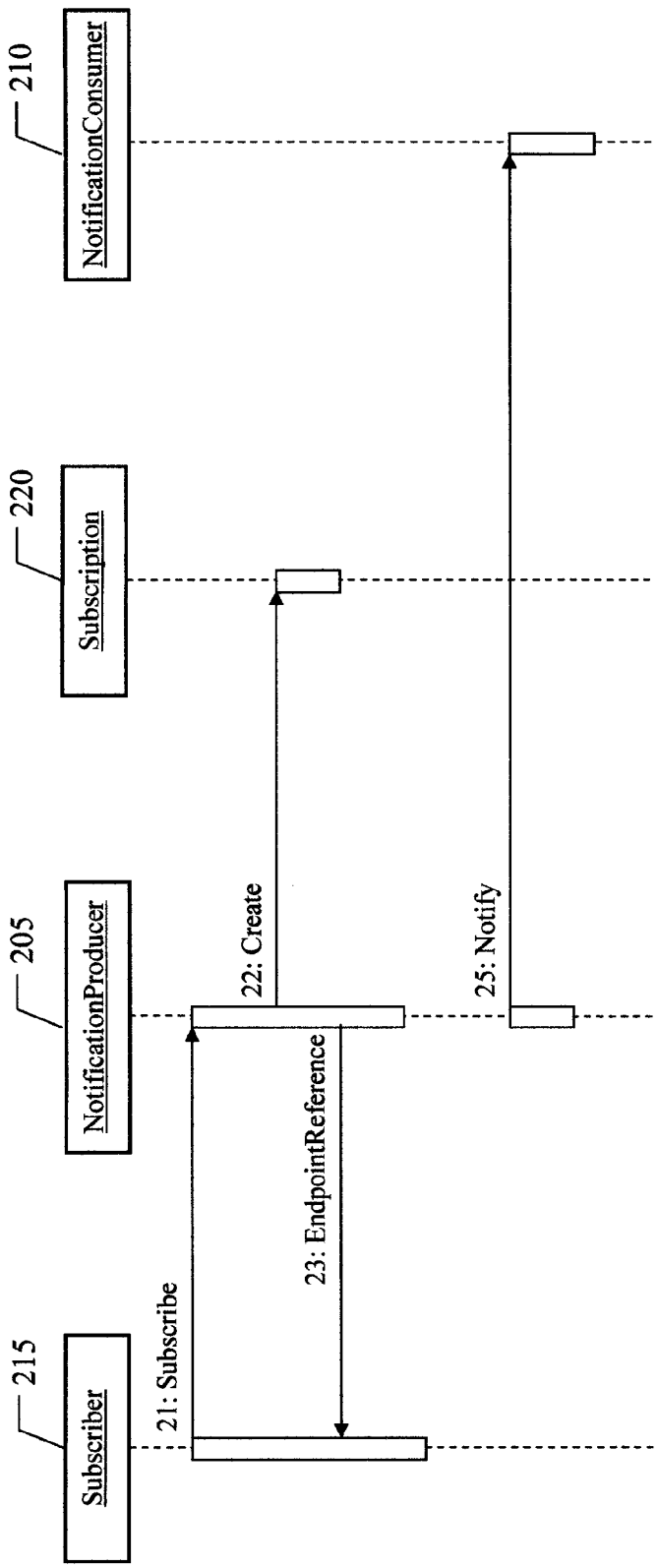
FIG. 2 is a sequence diagram representing a notification pattern that may be tested with the solution according to an embodiment of the invention.

The pattern of the WS-BaseNotification is illustrated in the sequence diagram of FIG. 2 (describing its dynamic behavior by means of a series of exchanged messages denoted with progressive numbers). In detail, NotificationProducers 205 also acting as Publishers are provided. Each Publisher is capable of detecting Situations (consisting of any occurrences of interest to third parties, such as a change of state of the Publisher, an environmental event, or an external event), and to translate them into Notifications containing information about the corresponding Situations. The Notifications may be either in raw form or in the form of NotificationMessages. In the first case, the Notifications consist of application-specific messages. Conversely, the NotificationMessages consist of XML elements conforming to the WS-Notification specification. In this case, each NotificationMessage also includes metadata elements that provide additional information about the corresponding Situation. Particularly, the NotificationMessage specifies a Topic that categorizes the Situation (as defined in the WS-Topics specification). Each NotificationProducer instead consists of a web service, which is capable of distributing the Notifications (and the NotificationMessages) to NotificationConsumers 210.

Each NotificationConsumer 210 is a web service that is interested in receiving the Notifications. For this purpose, the NotificationConsumers 210 must subscribe to the NotificationProducer 205. The operation is performed by Subscribers 215, which submit corresponding Subscribe requests to the NotificationProducer 205 (message "21.Subscribe"). Each Subscriber 215 may be any entity (even not a web service), either coincident to or distinct from the NotificationConsumer 210 to be subscribed. In response thereto, the NotificationProducer 205 creates a corresponding Subscription 220 (message "22.Create"). The operation is performed by a SubcriptionManager, which consists of a web service dedicated to manipulate the Subscriptions 220 (generally implemented by the NotificationProducer 205 itself as shown in the figure). Each Subscription 220 is a WS-Resource (i.e., a web service associated with a stateful entity), which represents a relationship between the NotificationProducer 205 and the NotificationConsumer 210. Generally, the Subscription 220 also indicates one or more Topics which the NotificationConsumer 210 is interested in. The NotificationProducer 205 then returns a corresponding EndpointReference to the Subscriber 215, which EndpointReference is used to identify the Subscription 220 according to the WS-Addressing specification (message "23.EndpointReference").

In this way, whenever a new NotificationMessage is created, such as in response to a corresponding Situation, the NotificationProducer 205 determines the NotificationConsumers 205 that are subscribed to its Topic, as indicated in the corresponding Subscriptions 220. The NotificationMessage is then notified to each matching NotificationConsumer 210 (e.g., message "25.Notify").

A more detailed description of the WS-BaseNotification specification can be found in the document "Web Services Base Notification 1.3 (WS-BaseNotification) OASIS Standard, 1 Oct. 2006" available at: "http://docs.oasis-open.org/wsn/wsn-ws_base_notification-1.3-spec-os.pdf", while a more detailed description of the WS-Topics specification can be found in the document "Web Services Topics 1.3 (WS-Topics) OASIS Standard, 1 Oct. 2006" available at: http://docs.oasis-open.org/wsn/wsn-ws_topics-1.3-spec-os.pdf (the entire disclosures of which are herein incorporated by reference).

Figure 3:
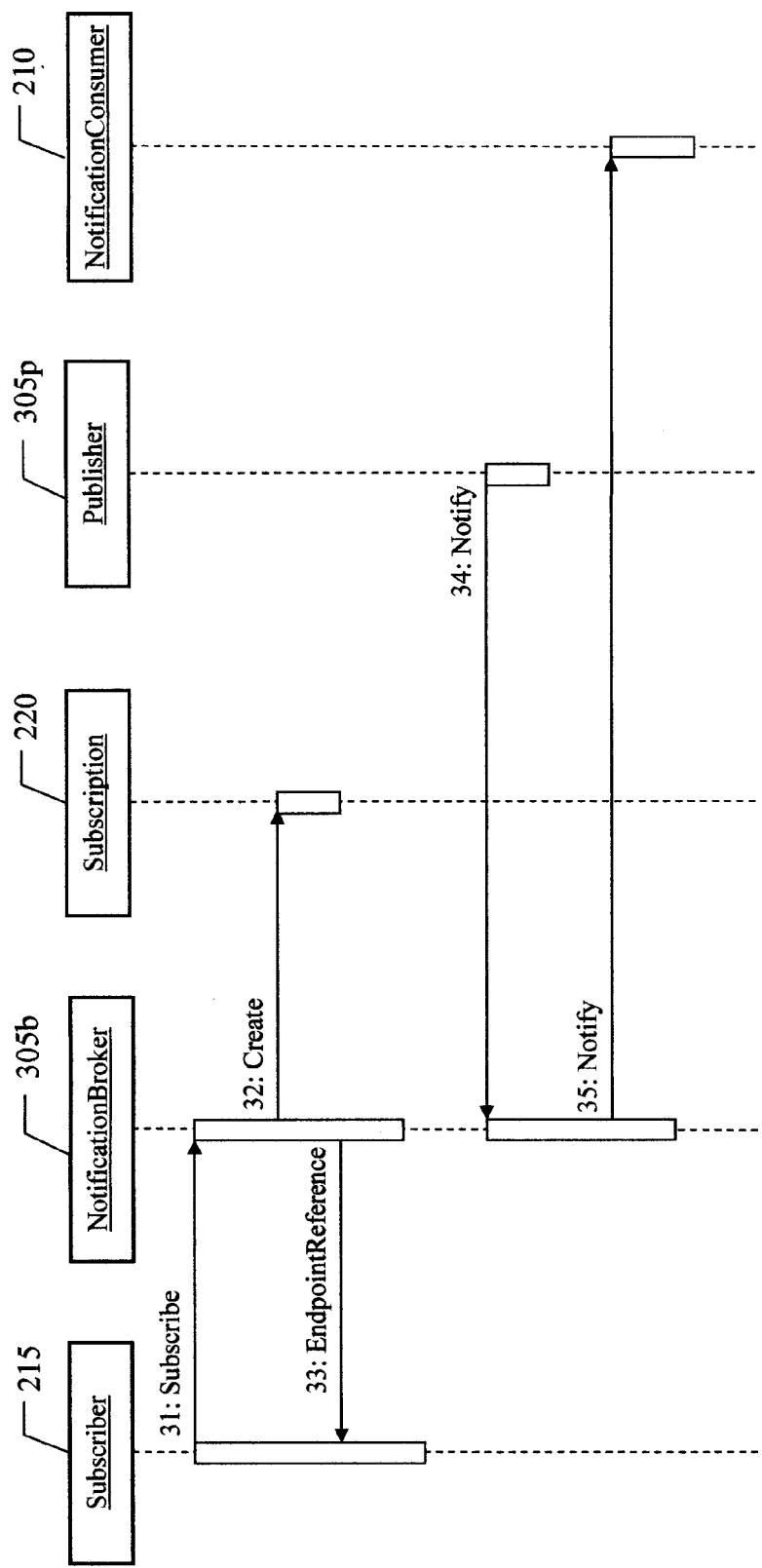
FIG. 3 is a sequence diagram representing another notification pattern that may be tested with the solution according to an embodiment of the invention.

The pattern of the WS-BrokeredNotification is instead illustrated the sequence diagram of FIG. 3 (hereinafter, the elements corresponding to the ones shown in the preceding figures are denoted with the same references and their explanation is omitted for the sake of exposition brevity). In this case, the NotificationMessages are created by Publishers 305$p$ that do not implement the NotificationProducer interface (and then may consist of any entities, even not web services). The NotificationMessages are instead distributed by separate NotificationBrokers 305$b$. Each NotificationBroker 305$b$ is a web service, which implements the NotificationConsumer interface for receiving NotificationMessages from the Publishers 305$p$. At the same time, the NotificationBroker 305$b$ also implements the NotificationProducer interface for receiving Subscribe requests from the Subscribers 215 (possibly acting as SubcriptionManager directly) and for notifying the NotificationMessages (received from the Publishers 305$p$) to the NotificationConsumers 210. In other words, the NotificationBroker 305$b$ operates as an intermediary, which decouples the Publishers 305$p$ from the NotificationConsumers 210. This allows simplifying the Publishers 305$p$ relieving them from the duty of SubscriptionManager and NotificationProducer). Moreover, it is possible to reduce the number of inter-service references, to facilitate the finding of the NotificationProducers, and to support anonymous Notifications. The Publishers 305$p$ and the NotificationConsumers 210 may not be aware of each other's identity.

For this purpose, the Publisher 305$p$ may register to the NotificationBroker 305$b$. The operation is performed by submitting a PublisherRegistration request, which involves the creation of a corresponding PublisherRegistration by the NotificationBroker 305$b$. The PublisherRegistration is a WS-Resource that represents a relationship between the Publisher 305$p$ and the NotificationBroker 305$b$. Generally, the PublisherRegistration also indicates one or more Topics that the Publisher 305$p$ is authorized to notify to the NotificationBroker 305$b$. The operation is performed by a PublisherRegistrationManager, which consists of a web service dedicated to manipulate the PublisherRegistrations (generally implemented by the NotificationBroker 305$b$ itself). Alternatively, the Publisher 305$p$ may be of the Demand-Based type. The Demand-Based Publisher 305$p$ is a web service that implements the NotificationProducer interface. In this case, the NotificationBroker 305$b$ subscribes to the Demand-Based Publisher 305$p$ by submitting a Subscribe request involving the creation of a corresponding Subscription by the Demand-Based Publisher 305$p$. The NotificationBroker 305$b$ pauses its Subscription when no NotificationConsumer 210 is subscribed for the Topic(s) of the Demand-Based Publisher 305$p$ (by submitting a corresponding PauseSubscription request) and it resumes the Subscription otherwise (by submitting a corresponding ResumeSubscription request). In this way, the Demand-Based Publisher 305$p$ does not need to create NotificationMessages uselessly (i.e., when nobody is interested in them). Nevertheless, the Demand-Based Publisher 305$p$ is only required to interact with the NotificationBroker 305$b$ (delegating all the other duties to it).

As above, the Subscriber 215 submits a Subscribe request to the NotificationBroker 305$b$ (message "31.Subscribe"). In response thereto, the NotificationBroker 305$b$ creates a corresponding Subscription 220 (e.g., message "32.Create"). The NotificationBroker 305$b$ then returns a corresponding EndpointReference to the Subscriber 215 (e.g., message "33.EndpointReference"). However, whenever a new NotificationMessage is created by the Publisher 305$p$ in response to a corresponding Situation, it is now notified to the NotificationBroker 305$b$ (e.g., message "34.Notify"). The NotificationBroker 305$b$ in turn determines the NotificationConsumers 210 that are subscribed to its Topic (as indicated in the corresponding Subscriptions 220). The NotificationMessage is then notified to each matching NotificationConsumer 210 (e.g., message "35.Notify").

A more detailed description of the WS-BrokeredNotification specification can be found in the document "Web Services Brokered Notification 1.3 (WS-BrokeredNotification) OASIS Standard, 1 Oct. 2006" available at: http://docs.oasis-open.org/wsn/wsn-ws_brokered_notification-1.3-spec-os-.pdf (the entire disclosure of which is herein incorporated by reference).

Figure 4:
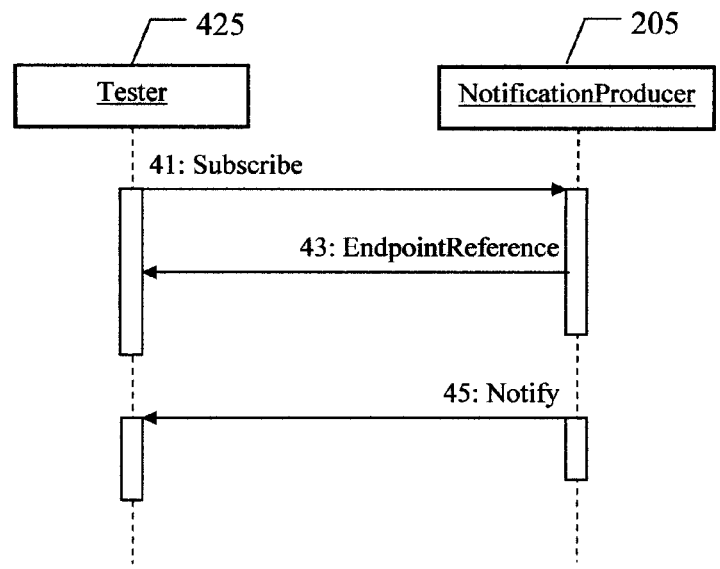
FIG. 4 is a sequence diagram representing an exemplary application of the solution according to an embodiment of the invention.

Moving to FIG. 4, in the solution according to an embodiment of the invention (as described in detail in the following) a tester 425 is provided to verify that the NotificationProducer 205 in the WS-BaseNotification specification behaves as expected. For this purpose, the tester 425 creates a Subscription request for subscribing itself as a NotificationConsumer. The operation is performed automatically according to the relevant WSDL document once the NotificationProducer 205 has been properly identified. The tester 425 submits this Subscribe request to the NotificationProducer 205 (e.g., message "41.Subscribe"). The tester 425 then verifies whether a corresponding EndpointReference is correctly returned by the NotificationProducer 205 (e.g., message "43.EndpointReference"). The tester 425 now waits for receiving a correct NotificationMessage from the NotificationProducer 205 (e.g., message "45.Notify").

Figure 5:
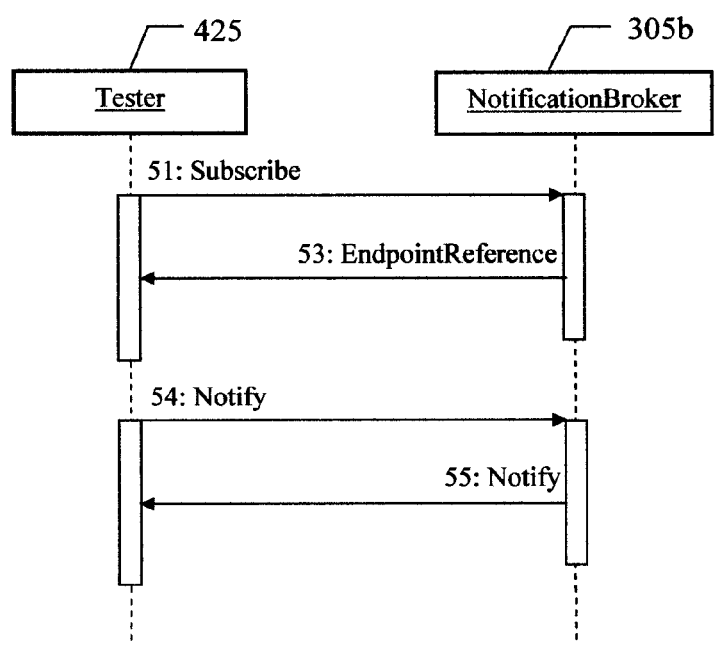
FIG. 5 is a sequence diagram representing another exemplary application of the solution according to an embodiment of the invention.

As shown in FIG. 5, the same technique may also be applied to test the NotificationBroker 305$b$ in the WS-BrokeredNotification specification. In this case, the tester 425 likewise creates a Subscription request for subscribing itself as a NotificationConsumer, which can occur according to the WSDL document once the NotificationBroker 305$b$ has been properly identified. The tester 425 submits this Subscribe request to the NotificationBroker 305$b$ (e.g., message "51.Subscribe"). The tester 425 again verifies whether a corresponding EndpointReference is correctly returned by the NotificationBroker 305b (message "53.EndpointReference"). However, the tester 425 now creates a NotificationMessage for itself automatically according to the WSDL document. The tester 425 submits this NotificationMessage to the NotificationBroker 305b (e.g., message "54.Notify"). As above, the tester 425 waits for receiving the same NotificationMessage correctly from the NotificationBroker 305b (e.g., message "55.Notify").

The proposed solution allows testing the default functionality of any notification-based software application. This technique is of general applicability to any standards and/or specifications.

At the same time, a relatively simple infrastructure is required to run the test process. Particularly, the test process is non-intrusive since it does not require the deployment of any specific content to the component under test. Moreover, the definition of the test process and its running are substantially automatic with a minimum human intervention for the identification of the component to be tested. This also allows launching multiple test processes concurrently in order to verify the performance of the component under test. Therefore, it is possible to strongly increase the quality of the obtained results.

All of the above has a beneficial impact on the cost of the test process. This fosters the extensive application of the test process, with a positive repercussion on the reliability of the notification-based software applications.

Figure 6:
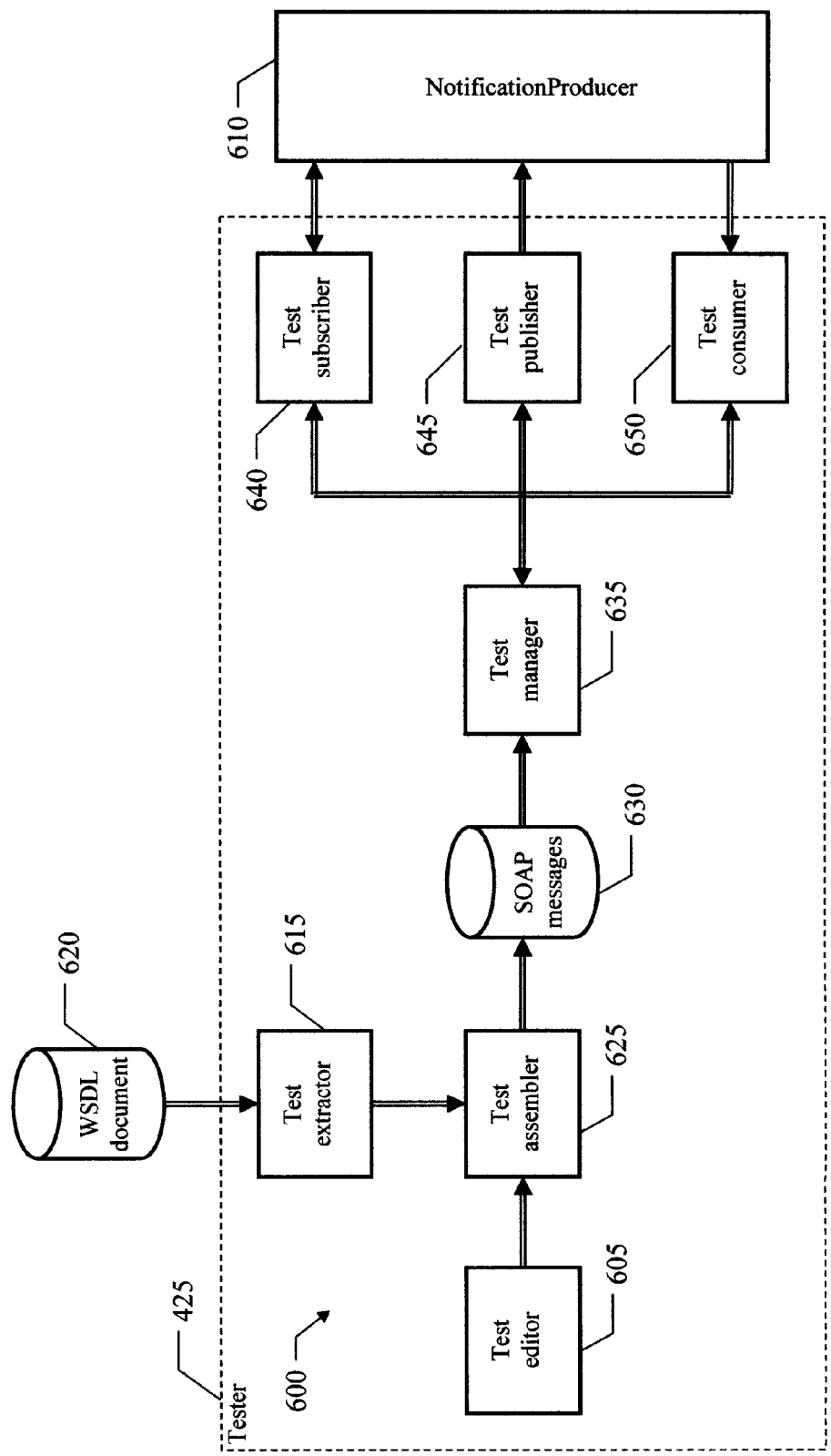
FIG. 6 shows the main software components that can be used to implement the solution according to an embodiment of the invention.

The main software components that can be used to implement the solution according to an embodiment of the invention are shown in FIG. 6. The information (programs and data) is typically stored on the hard-disk and loaded (at least partially) into the working memory of each computer when the programs are running, together with an operating system and other application programs (not shown in the figure). The programs are initially installed onto the hard disk (e.g., from DVD-ROM).

Particularly, the tester 425 runs a test suite 600. The test suite 600 includes a test editor 605 that is used to input the information required to identify each NotificationProducer to be tested either in the WS-BaseNotification or in the WS-BrokeredNotification specification, which is generically denoted with the reference 610 in the figure. A test extractor 615 instead accesses the relevant WSDL document (denoted with 620) at a known address. The test extractor 615 then retrieves a template that defines the structure of the SOAP messages (for the Subscribe request in any case, and for the NotificationMessage in the case of the WS-BrokeredNotification specification) from the WSDL document 620.

The information collected by the test editor 605 and the test extractor 615 is supplied to a test assembler 625. The test assembler 625 accordingly creates the actual SOAP messages that are required to test the NotificationProducer 610 (i.e., the Subscribe request and possibly the NotificationMessage). These SOAP messages are then saved into a repository 630.

The repository 630 is accessed by a test manager 635, which controls the actual execution of a test process on the NotificationProducer 610. For this purpose, the test manager 635 passes the Subscribe request extracted from the repository 630 to a test subscriber 640 for its submission to the NotificationProducer 610. The test subscriber 640 in turn forwards the corresponding EndpointReference (returned by the NotificationProducer 610) to the test manager 635. In the case of the WS-BrokeredNotification specification, the test manager 635 also passes the NotificationMessage extracted from the repository 630 to a test publisher 645 for its submission to the NotificationProducer 610. A test consumer 650 receives the expected NotificationMessage from the NotificationProducer 610 and forwards it to the test manager 635.

Figure 7A:
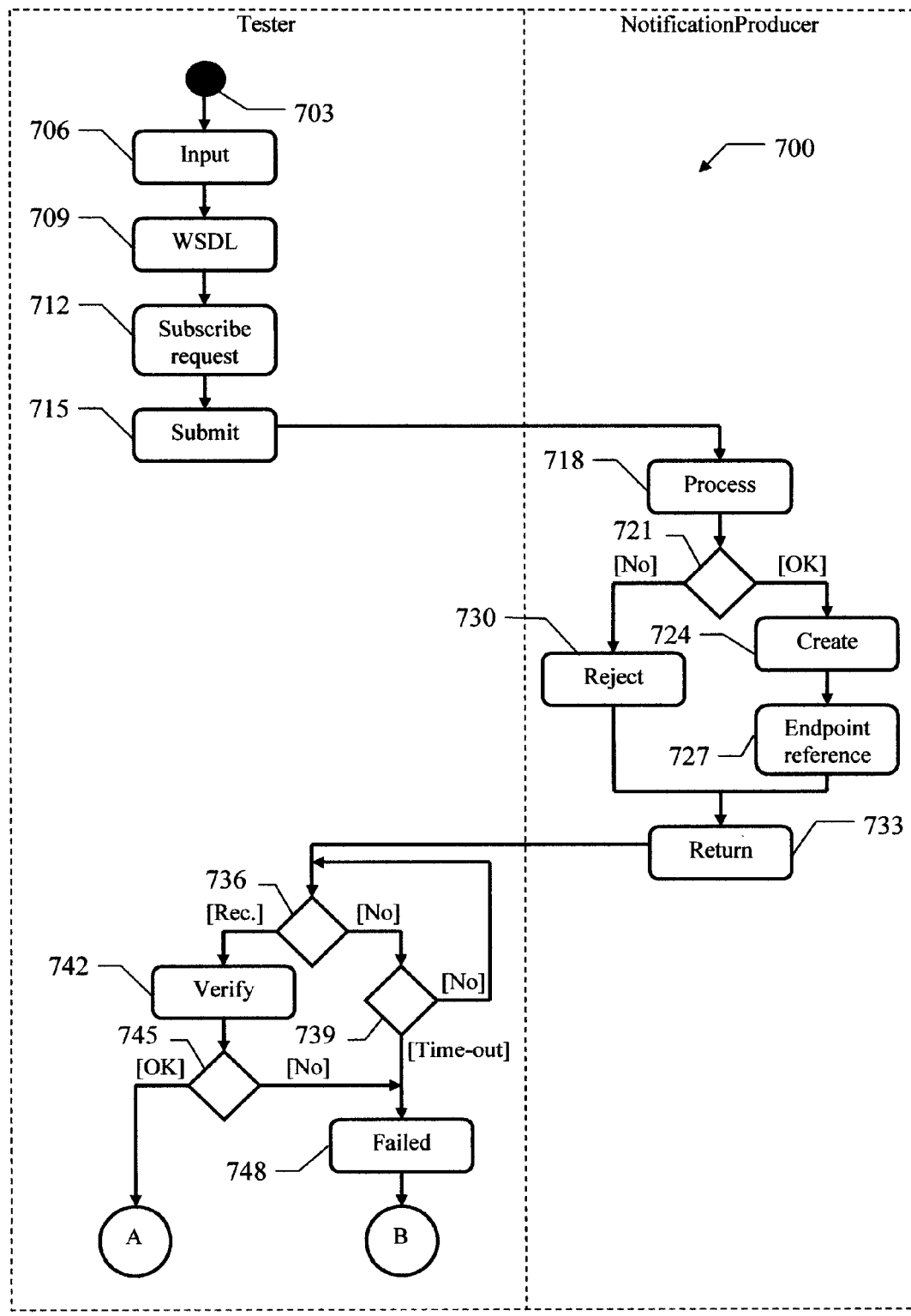
FIG. 7 is a diagram describing the flow of activities relating to an implementation of the solution according to an embodiment of the invention.
Figure 7B:
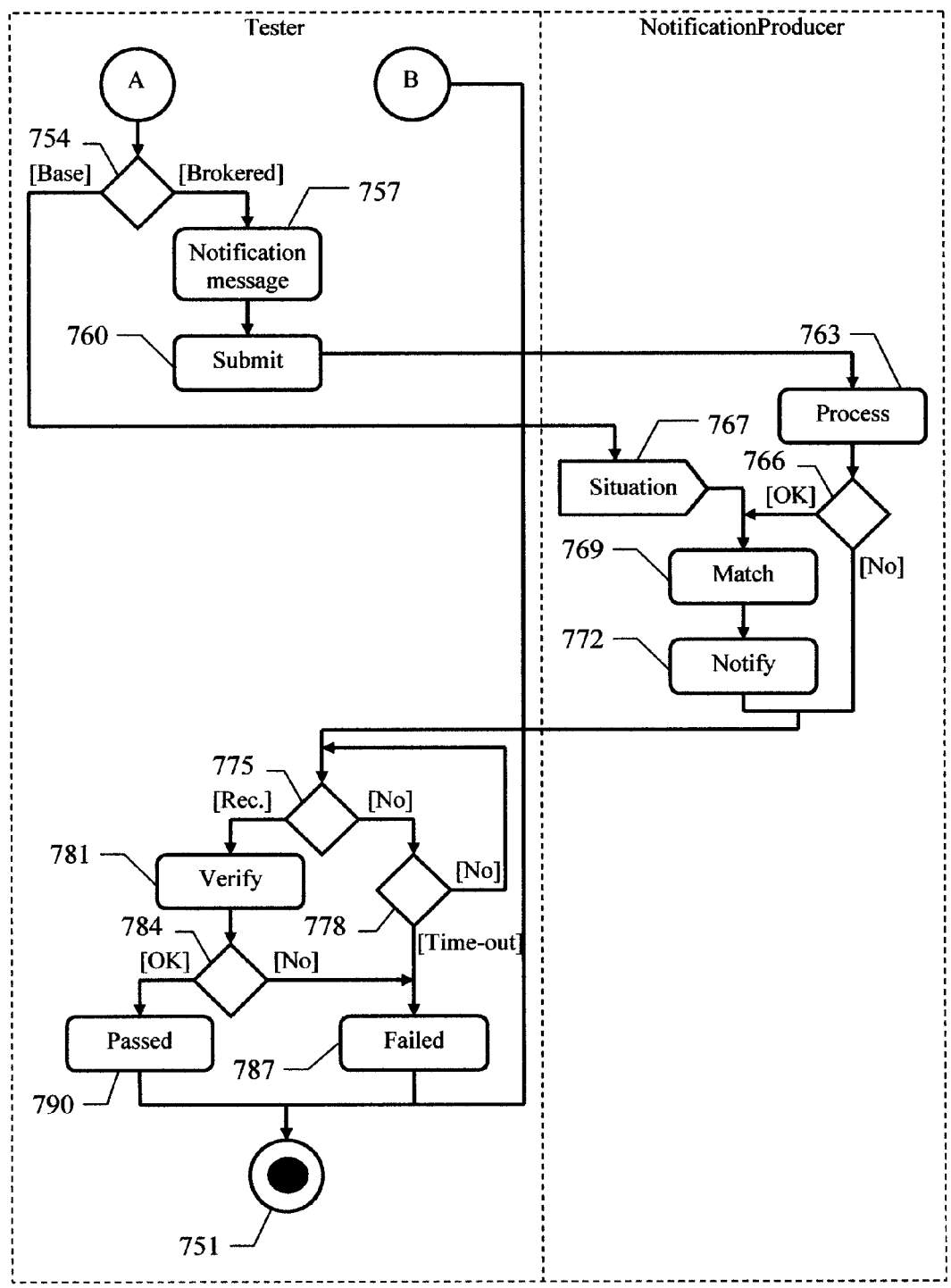

With reference now to FIG. 7, the logic flow of an exemplary process that can be implemented in the above-described system to test a generic NotificationProducer is represented with a method 700.

The method begins at the black start circle 703 in the swim-lane of the tester. Continuing to block 706, the information required to identify the NotificationProducer to be tested is input manually. Particularly, this information includes the URI of the NotificationProducer and its type (i.e., implementing the WS-BaseNotification specification or the WS-BrokeredNotification specification). The method then passes to block 709, wherein the tester accesses the WSDL document at its known address, so as to extract the templates of the relevant SOAP messages (i.e., Subscribe request and possibly NotificationMessage). With reference now to block 712, the tester creates the desired Subscribe request by filling its template with the required information. Particularly, the NotificationProducer is identified as the receiver of the corresponding SOAP message, while the tester itself is identified as the NotificationConsumer to be subscribed. The Subscribe request is then submitted at block 715 so as to have it relayed along the desired path until reaching the NotificationProducer.

Moving now to the swim-lane of the NotificationProducer, the received Subscribe request is processed at block 718. The flow of activity then branches at block 721. If the tester can be subscribed to the NotificationProducer, the corresponding Subscription is created at block 724. The NotificationProducer at block 727 then generates a response message including the EndpointReference of this Subscription. Conversely, the NotificationProducer rejects the Subscribe request and the method descends from block 721 to block 730, wherein a response message including an indication of the rejection is generated. For example, this may happen when the NotificationProducer does not support the required Notification form (i.e., raw or NotificationMessages), when the NotificationProducer does not support the required Topics o vice-versa when it does not accept Subscribe requests without Topics and no one has been specified, and the like. In any case, the method then proceeds to block 733 either from block 727 or from block 730. In this phase, the response message so generated is returned to the tester.

The tester is in a waiting condition for the response message at block 736. Particularly, if the response message is not received, a test is made at block 739 to verify whether a predefined time-out from the submission of the Subscribe request has expired. The time-out is set according to an expected latency of the system (e.g., 30-120 s). If the time-out has not expired, the method returns to block 736 in a continuous loop. The loop is exit by descending from block 736 to block 742 as soon as the response message is received from the NotificationProducer. At this point, the response message is verified. The flow of activity then branches at block 745 according to the result of the verification. If the response message is not correct (as defined in the WS-Addressing specification), or it contains a Fault element (meaning that the Subscribe request was rejected by the NotificationProducer) or any SOAP and/or HTTP error code (meaning that the Subscribe message was not correctly delivered to the NotificationProducer) the method passes to block 748. The same point is also reached from block 739 when the response message is not received within the prescribed time-out (e.g., because of a network problem). In this case, the test process is set as failed. The method then ends at the concentric white/black stop circles 751.

Referring back to block 745, if the response message is correct (i.e., it includes an EndpointReference element) the flow of activity descends into block 754, wherein it branches according to the type of the NotificationProducer, as specified at block 706. Particularly, in the case of the WS-BrokeredNotification specification the tester at block 757 creates the desired NotificationMessage by filling its template with the required information. Particularly, the NotificationProducer is identified as the receiver of the corresponding SOAP message, while the same Topic for which the tester has been subscribed is specified. The NotificationMessage is then submitted at block 760 so as to have it relayed along the desired path until reaching the NotificationProducer. Moving to block 763 in the swim-lane of the NotificationProducer, the received NotificationMessage is processed. The flow of activity then branches at block 766. If the NotificationProducer can accept the NotificationMessage, the flow of activity descends into block 769. The same point is also reached from block 754 (in the case of the WS-BaseNotification specification) as soon as at block 767 a NotificationMessage (of the Topic which the tester is subscribed to) is created in response to a corresponding Situation.

In this phase, a matching operation is performed to determine the NotificationConsumers that are subscribed for the same Topic of the NotificationMessage. Continuing to block 772, the NotificationMessage is notified to each one of the matching NotificationConsumers. The method then proceeds to block 775 in the swim-lane of the tester. The same point is also reached directly from block 766 when the NotificationProducer cannot accept the NotificationMessage (e.g., because it does not support its Topic), so that no notification is performed.

The tester is in a waiting condition for the NotificationMessage at block 775. Particularly, if the NotificationMessage is not received, a test is made at block 778 to verify whether a predefined time-out from the submission of the Subscribe request (WS-BaseNotification) or the NotificationMessage (WS-BrokeredNotification) has expired. In the case of the WS-BaseNotification, the time-out is set to a value corresponding to the expected application-specific frequency of occurrence of the corresponding Situations (e.g., equal to 2-5 times an average period thereof). In the case of the WS-BrokeredNotification, the time-out is instead set to a value corresponding to an expected latency of the system (e.g., 30-120 s). If the time-out has not expired, the method returns to block 775 in a continuous loop. The loop is exit by descending from block 775 to block 781 as soon as the NotificationMessage is received from the NotificationProducer. At this point, the NotificationMessage is verified. The flow of activity then branches at block 784 according to the result of the verification. If the NotificationMessage is not as expected (i.e., it is not of the same Topic the tester is subscribed to, and it does not contain the same information that was submitted to the NotificationProducer at block 760 in the case of the WS-BrokeredNotification) the method passes to block 787. The same point is also reached from block 778 when the NotificationMessage is not received within the prescribed time-out (e.g., because it was not notified or a network problem occurred). As above, the test process is set as failed. In this case as well, the method then ends at the stop circles 751. Referring back to block 784, if the NotificationMessage is as expected the flow of activity descends into block 790, wherein the test is instead set as passed. The method again ends at the stop circles 751.

For example, let us consider the following simplified template of the SOAP message for the Subscribe request (as available for the WS-BaseNotification in the WSDL document at: "http://www.ibm.com/developerworks/library/specification/ws-notification/WS-BaseN.wsdl", and for the WS-BrokeredNotification in the WSDL document at: "http://www.ibm.com/developerworks/library/specification/ws-notification/WS-BrokeredN.wsdl"):

```
<soapenv:Envelope
  xmlns:soapenc="http://schemas.xmlsoap.org/soap/encoding/"
  xmlns:soapenv="http://schemas.xmlsoap.org/soap/envelope/"
  xmlns:wsa="http://www.w3.org/2005/08/addressing"
  xmlns:xsd="http://www.w3.org/2001/XMLSchema"
  xmlns:xsi="http://www.w3.org/2001/XMLSchema-instance">
  <soapenv:Header>
    <wsa:To></wsa:To>
    <wsa:Action>http://docs.oasis-open.org/wsn/bw-2/
    NotificationProducer/SubscribeRequest</wsa:Action>
    <wsa:MessageID></wsa:MessageID>
  </soapenv:Header>
  <soapenv:Body>
    <subns:Subscribe xmlns:subns="http://docs.oasis-open.org/wsn/b-2">
      <ConsumerReference xmlns="http://docs.oasis-open.org/wsn/b-2">
        <wsa:Address></wsa:Address>
      </ConsumerReference>
      <Filter xmlns="http://docs.oasis-open.org/wsn/b-2">
        <b2:TopicExpression
          xmlns:b2="http://docs.oasis-open.org/wsn/b-2"
          xmlns:filterns=
          Dialect="http://docs.oasis-open.org/wsn/t-1/
          TopicExpression/Simple">
          filterns:
        </b2:TopicExpression>
      </Filter>
    </subns:Subscribe>
  </soapenv:Body>
</soapenv:Envelope>
```

Particularly, the SOAP message includes (within an envelope defined by the element "soapenv:Envelope") the definition of the relevant Namespaces, consisting of unique identifiers, generally in the form of URIs, which are used to qualify names (reserved attribute "xmlns:"). The SOAP message then includes a header (element "soapenv:Header"). The header specifies, according to the WS-Addressing specification (Namespace "wsa:"), the receiver of the SOAP message (element "wsa:To"), the URI where the semantic of the Subscribe request is defined (element "wsa:Action"), and a unique identifier of the SOAP message (element "wsa:MessageID"). The header is followed by a body (element "soapenv:Body"). The body specifies the content of the Subscription request in specific standard Namespaces (element "subns:Subscribe"). Particularly, the Subscribe request defines the NotificationConsumer to be subscribed (element "ConsumerReference"). For this purpose, there is provided the URI that is used to identify the NotificationConsumer according to the WS-Addressing specification (element "wsa:Address"). The Subscribe request also defines the type of NotificationMessages that the NotificationConsumer is interested in receiving (element "Filter"). For this purpose, one or more child elements thereof specify the Topics to be used to filter the NotificationMessages (elements "TopicExpression"), which Topics must be expressed in a language defined at a corresponding URI (element "Dialect").

The tester is then capable of automatically generating the following SOAP message for the Subscribe request to be submitted to the NotificationProducer under test (either in the WS-BaseNotification or in the WS-BrokeredNotification specification):

```
<soapenv:Envelope
xmlns:soapenc="http://schemas.xmlsoap.org/soap/encoding/"
xmlns:soapenv="http://schemas.xmlsoap.org/soap/envelope/"
xmlns:wsa="http://www.w3.org/2005/08/addressing"
xmlns:xsd="http://www.w3.org/2001/XMLSchema"
xmlns:xsi="http://www.w3.org/2001/XMLSchema-instance">
    <soapenv:Header>
        <wsa:To>MyNotificationProducer</wsa:To>
        <wsa:Action>http://docs.oasis-open.org/wsn/bw-2/
            NotificationProducer/SubscribeRequest</wsa:Action>
        <wsa:MessageID>MyMesssageID</wsa:MessageID>
    </soapenv:Header>
    <soapenv:Body>
        <subns:Subscribe xmlns:subns="http://docs.oasis-open.org/wsn/b-2">
            <ConsumerReference xmlns="http://docs.oasis-open.org/wsn/b-2">
                <wsa:Address>MyTester</wsa:Address>
            </ConsumerReference>
            <Filter xmlns="http://docs.oasis-open.org/wsn/b-2">
                <b2:TopicExpression
                    xmlns:b2="http://docs.oasis-open.org/wsn/b-2"
                    xmlns:filterns=MyTopicURI
                    Dialect="http://docs.oasis-open.org/wsn/t-1/
                    TopicExpression/Simple">
                    filterns:MyTopicName
                </b2:TopicExpression>
            </Filter>
        </subns:Subscribe>
    </soapenv:Body>
</soapenv:Envelope>
```

The added information (in bold) is "MyNotificationProducer" (input URI of the NotificationProducer under test), "MyMessageID" (automatically generated value identifying the Subscribe request), "MyTester" (known URI of the tester to be subscribed), "MyTopicURI" and "MyTopicName". The last two values (identifying the Namespace and the local name of the Topic, respectively) are automatically generated. However, they may be edited if it is necessary (e.g., when the NotificationProducer only supports specific Topics).

When the NotificationProducer under test is a NotificationBroker (in the WS-BrokeredNotification specification), let us also consider the following simplified template of the SOAP message for the NotificationMessage (as available in the same WSDL document mentioned above):

```
<soapenv:Envelope
xmlns:soapenc="http://schemas.xmlsoap.org/soap/encoding/"
xmlns:soapenv="http://schemas.xmlsoap.org/soap/envelope/"
xmlns:wsa="http://www.w3.org/2005/08/addressing"
xmlns:xsd="http://www.w3.org/2001/XMLSchema"
xmlns:xsi="http://www.w3.org/2001/XMLSchema-instance">
    <soapenv:Header>
        <wsa:To></wsa:To>
        <wsa:Action>http://docs.oasis-open.org/wsn/bw-2/
            NotificationConsumer/Notify</wsa:Action>
        <wsa:MessageID></wsa:MessageID>
    </soapenv:Header>
    <soapenv:Body>
        <notns:Notify xmlns:notns="http://docs.oasis-open.org/wsn/b-2">
            <NotificationMessage xmlns=
            "http://docs.oasis-open.org/wsn/b-2">
                <b2:Topic
                    xmlns:b2="http://docs.oasis-open.org/wsn/b-2"
                    xmlns:filterns=
                    Dialect="http://docs.oasis-open.org/wsn/t-1/
                    TopicExpression/Simple">
                    filterns:
                </b2:Topic>
                <b2:Message xmlns:b2="http://docs.oasis-open.org/wsn/b-2">
                </b2:Message>
            </NotificationMessage>
        </notns:Notify>
    </soapenv:Body>
</soapenv:Envelope>
```

The SOAP message again includes (within its envelope) the definition of the relevant Namespaces. Likewise, the header of the SOAP message specifies the receiver of the SOAP message (element "wsa:To"), the URI where the semantic of the NotificationMessage is defined (element "wsa:Action"), and a unique identifier of the SOAP message (element "wsa:MessageID"). The body instead specifies one or more Notifications (element "notns:Notify"). Each Notification is in turn defined in a corresponding child element (element "NotificationMessage"). For this purpose, there is specified the Topic of the Notification (element "Topic"), its language (element "Dialect"), and the relevant payload (element "Message").

The tester is then capable of automatically generating the following SOAP message for the NotificationMessage to be submitted to the NotificationProducer (i.e., NotificationBroker) under test:

```
<soapenv:Envelope
xmlns:soapenc="http://schemas.xmlsoap.org/soap/encoding/"
xmlns:soapenv="http://schemas.xmlsoap.org/soap/envelope/"
xmlns:wsa="http://www.w3.org/2005/08/addressing"
xmlns:xsd="http://www.w3.org/2001/XMLSchema"
xmlns:xsi="http://www.w3.org/2001/XMLSchema-instance">
    <soapenv:Header>
        <wsa:To>MyNotificationProducer</wsa:To>
        <wsa:Action>http://docs.oasis-open.org/wsn/bw-2/
            NotificationConsumer/Notify</wsa:Action>
        <wsa:MessageID>MyMesssageID</wsa:MessageID>
    </soapenv:Header>
    <soapenv:Body>
        <notns:Notify xmlns:notns="http://docs.oasis-open.org/wsn/b-2">
            <NotificationMessage xmlns=
            "http://docs.oasis-open.org/wsn/b-2">
                <b2:Topic
                    xmlns:b2="http://docs.oasis-open.org/wsn/b-2"
                    xmlns:filterns=MyTopicURI
                    Dialect="http://docs.oasis-open.org/wsn/t-1/
                    TopicExpression/Simple">
                    filterns:MyTopicName
                </b2:Topic>
                <b2:Message xmlns:b2="http://docs.oasis-open.org/wsn/b-2">
                    MyMessage
                </b2:Message>
            </NotificationMessage>
        </notns:Notify>
    </soapenv:Body>
</soapenv:Envelope>
```

The added information (in bold) is again "MyNotificationProducer", "MyMessageID", "MyTopicURI" and "MyTopicName", with the addition of "MyMessage" (automatically generated payload of the NotificationMessage).

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof, conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

Similar considerations apply if the application under test implements additional specifications (e.g., the WS-Security specification for securing the Notifications and the WS-Trust specification for authenticating the involved computers). More generally, the same solution may be applied to test software applications based on any other notification pattern (e.g., implementing the WS-Eventing specification).

Alternatively, it is possible to provide the identifier of the NotificationProducers to be tested in any other way (e.g., listing them in an input file).

Nothing prevents using non-qualified Topics (i.e., belonging to a special built-in Namespace allowing the dynamic addition of ad-hoc Topics); in any case, the proposed solution may also be implemented without specifying any Topic (in the Subscribe request and possibly in the NotificationMessage).

Similar considerations apply if the result of the subscription is determined in a similar way (e.g., by verifying a return code).

The above-described time-out for the WS-BaseNotification specification is merely illustrative; particularly, the time-out may be set to any value (starting from either the submission of the Subscribe request or the reception of the corresponding EndpointReference), even independently of the application under test. Likewise, in a more complex implementation it is also possible to verify the reception of any number of NotificationMessages over time.

Moreover, the NotificationProducer implementing the WS-BrokeredNotification specification may be tested in a different way (e.g., by registering the tester as a Publisher to the NotificationBroker or vice-versa by emulating a Demand-Based Publisher).

Alternatively, it is also possible to detect the type of NotificationProducer automatically.

Similar considerations as above apply to the time-out for testing the NotificationProducer implementing the WS-BrokeredNotification specification.

In any case, nothing prevents testing NotificationProducers implementing the WS-BaseNotification specification only, the WS-BrokeredNotification only, or any other specification—for example, of the pull type (wherein the NotificationMessages are retrieved by the NotificationConsumers of their own volition).

Naturally, the reference to the web services and the WSDL document must not be interpreted in a limitative manner; indeed, the same solution lends itself to be applied more generally to any other service oriented environment, whose specification is defined in one or more documents, or any equivalent publication (e.g., conforming to the EDI standard).

Likewise, the messages may be implemented with any other (high-level and/or transport) protocols (e.g., the XML-RPC, the WDDX, the SMTP, the RSS, and so on).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by any data processing system or in connection therewith (e.g., within a virtual machine). Particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (e.g., integrated in a chip of semiconductor material), or with a combination of software and hardware.

Moreover, the tester may be implemented with separate web services emulating the Subscriber, the Publisher (if necessary) and the NotificationConsumer, respectively. More generally, the tester may consist of one or more other data processing entities (even not consisting of web services).

The proposed method may also be carried out on a system having a different architecture or including equivalent units (e.g., based on a local network). Moreover, each computer may have another structure or may include similar elements (such as cache memories temporarily storing the programs or parts thereof). In any case, it is possible to replace the computer with any code execution entity (such as a PDA, a mobile phone, and the like), or with a combination thereof (such as a multi-tier architecture, a grid computing infrastructure, and the like).

The invention claimed is:

1. A method for comprising:
   testing a notification-based software application in a service oriented data processing environment, the software application including at least one notification producer adapted to distribute notification messages to notification consumers being subscribed thereto according to a specification defined in a corresponding publication, wherein for each notification producer the testing comprises:
   creating a subscribe request according to the publication for subscribing a tester as a notification consumer to the notification producer, wherein the subscribe request comprises a test topic;
   submitting the subscribe request to the notification producer;
   verifying a result of the subscription; and
   verifying a reception by the tester of at least one test notification message from the notification producer, wherein the at least one test notification message is associated with the test topic that the tester has subscribed.

2. The method according to claim 1, wherein creating the subscribe request comprises:
   providing an identifier of the notification producer;
   extracting a definition of the subscribe message from the publication; and
   adding, to the definition of the subscribe message, the identifier of the notification producer as a receiver of the subscribe message and an identifier of the tester as the notification consumer to be subscribed.

3. The method according to claim 2, wherein creating the subscribe request further comprises: creating the subscribe request for the notification messages of the test topic.

4. The method according to claim 1, wherein verifying the result of the subscription comprises: verifying a reception of a reference to a subscription resource representing the subscription of the tester to the notification producer.

5. The method according to claim 4, wherein the notification producer is a publisher adapted to create the notification messages in response to corresponding situations, wherein verifying the reception by the tester of at least one test notification message comprises: verifying the reception of the at least one test notification message within a time-out from the subscription, the time-out corresponding to an expected frequency of the situations.

6. The method according to claim 1, wherein the notification producer is a notification broker adapted to receive the notification messages from separate publishers, the method further comprising: creating the at least one test notification message according to the publication; and submitting each test notification message to the notification producer to cause the notification producer to notify the test notification message in response thereto.

7. The method according to claim 6, further comprising: providing an indication of a type of the notification producer, wherein creating the at least one test notification message and submitting each test notification message is conditioned to the type being notification broker.

8. The method according to claim 7, wherein verifying the reception by the tester of at least one test notification message comprises: verifying the reception of each test notification message within a further time-out from the submission of the test notification message.

9. The method according to claim 1, wherein the notification producer is a web service and the publication is a WSDL document.

10. The method according to any claim 1, wherein each test notification message and the subscribe request are SOAP messages.

11. A computer program product comprising:
a non-transitory computer usable medium having computer usable program code embodied therewith, said computer program product comprising:
computer usable program code configured to test a notification-based software application in a service oriented data processing environment, the software application including at least one notification producer adapted to distribute notification messages to notification consumers being subscribed thereto according to a specification defined in a corresponding publication, said computer usable program code configured to test the notification-based software application in a service oriented data processing environment comprises:
computer usable program code configured to create a subscribe request according to the publication for subscribing a tester as a notification consumer to the notification producer, wherein the subscribe request comprises a test topic;
computer usable program code configured to submit the subscribe request to the notification producer;
computer usable program code configured to verify a result of the subscription;
and
computer usable program code configured to verify a reception by the tester of at least one test notification message from the notification producer, wherein the at least one test notification message is associated with a test topic that the tester has subscribed.

12. The computer program product of claim 11, wherein said computer program product is executes as a service provided to at least one remotely located client requesting the service over a network.

13. The computer program product of claim 11, wherein said computer usable program code configured to create the subscribe request further comprises: computer usable program code configured to provide an identifier of the notification producer; computer usable program code configured to extract a definition of the subscribe message from the publication; and computer usable program code configured to add, to the definition of the subscribe message, the identifier of the notification producer as a receiver of the subscribe message and an identifier of the tester as the notification consumer to be subscribed.

14. The computer program product according to claim 11, wherein the computer usable program code configured to verify the result of the subscription comprises: computer usable program code configured to verify a reception of a reference to a subscription resource representing the subscription of the tester to the notification producer.

15. The computer program product according to claim 11, wherein the notification producer is a notification broker adapted to receive the notification messages from separate publishers, the computer program product further comprising:
computer usable program code configured to create the at least one test notification message according to the publication; and
computer usable program code configured to submit each test notification message to the notification producer to cause the notification producer to notify the test notification message in response thereto.

16. A system comprising:
at least one non-transitory storage medium;
at least one processor capable of executing program instructions;
the software application, comprising program instructions stored in said at least one non-transitory storage medium, said software application including at least one notification producer adapted to distribute notification messages to notification consumers being subscribed thereto according to a specification defined in a corresponding publication, said system being configured to test a notification-based software application in a service oriented data processing environment, said system executes the program instructions of the software application using the processor to:
create a subscribe request according to the publication for subscribing a tester as a notification consumer to the notification producer, wherein the subscribe request comprises a test topic;
submit the subscribe request to the notification producer;
verify a result of the subscription;
create, through the tester, the at least one test notification message associated with the test topic, according to the publication;
submit the at least one test notification message to the notification producer; and
verify a reception by the tester of at least one test notification message from the notification producer, wherein the at least one test notification message is associated with a test topic that the tester has subscribed, wherein the verifying a reception by the tester comprises verifying the reception of each test notification message within a threshold time from the submission of the test notification message.

17. The system of claim 16, wherein said system provides a service to at least one remotely located client requesting the service over a network, wherein said service creates the subscribe request, submits the subscribe request, verifies the result, and verifies the reception.

18. The system of claim 16, wherein said system is further configured to:
provide an identifier of the notification producer;
extract a definition of the subscribe message from the publication; and
add, to the definition of the subscribe message, the identifier of the notification producer as a receiver of the subscribe message and an identifier of the tester as the notification consumer to be subscribed.

19. The system according to claim 16, wherein the system is further configured to: verify a reception of a reference to a subscription resource representing the subscription of the tester to the notification producer.

20. The system according to claim 16, wherein the notification producer is a notification broker adapted to receive the notification messages from separate publishers, the system being further configured to:
create the at least one test notification message according to the publication; and
submit each test notification message to the notification producer to cause the notification producer to notify the test notification message in response thereto.

* * * * *